United States Patent [19]
Dole

[11] Patent Number: 5,642,907
[45] Date of Patent: Jul. 1, 1997

[54] END FITTING FOR SPRINKLER SYSTEM

[75] Inventor: Douglas R. Dole, Whitehouse Station, N.J.

[73] Assignee: Victaulic Company of America, Easton, Pa.

[21] Appl. No.: 650,192

[22] Filed: May 20, 1996

[51] Int. Cl.⁶ .................................................. F16L 17/035
[52] U.S. Cl. ...................... 285/112; 285/901; 285/148.19; 285/148.23; 239/593
[58] Field of Search .................................... 285/175, 112, 285/176, 177, 901; 239/589, 592, 593, 594, 598

[56] References Cited

U.S. PATENT DOCUMENTS 2,623,791  12/1952  Schmitz ................................ 239/593
3,392,921  7/1968  Demaison ............................. 239/589
5,031,755  7/1991  Blakeley ............................. 285/177 X

FOREIGN PATENT DOCUMENTS 2657  of 1909  United Kingdom .................. 285/177

*Primary Examiner*—Dave W. Arola
*Attorney, Agent, or Firm*—Abelman, Frayne & Schwab

[57]  ABSTRACT

An end fitting for a water supply pipe of a sprinkler system is in the form of a hollow tubular body having an internal cavity which progressively decreases in cross-sectional area from an end of the body attached to the supply pipe to an opposite end of the body in the manner of a convergent nozzle, in order to enhance the pressure of water available to a sprinkler head attached to the fitting at a position remote from the pipe end.

9 Claims, 3 Drawing Sheets

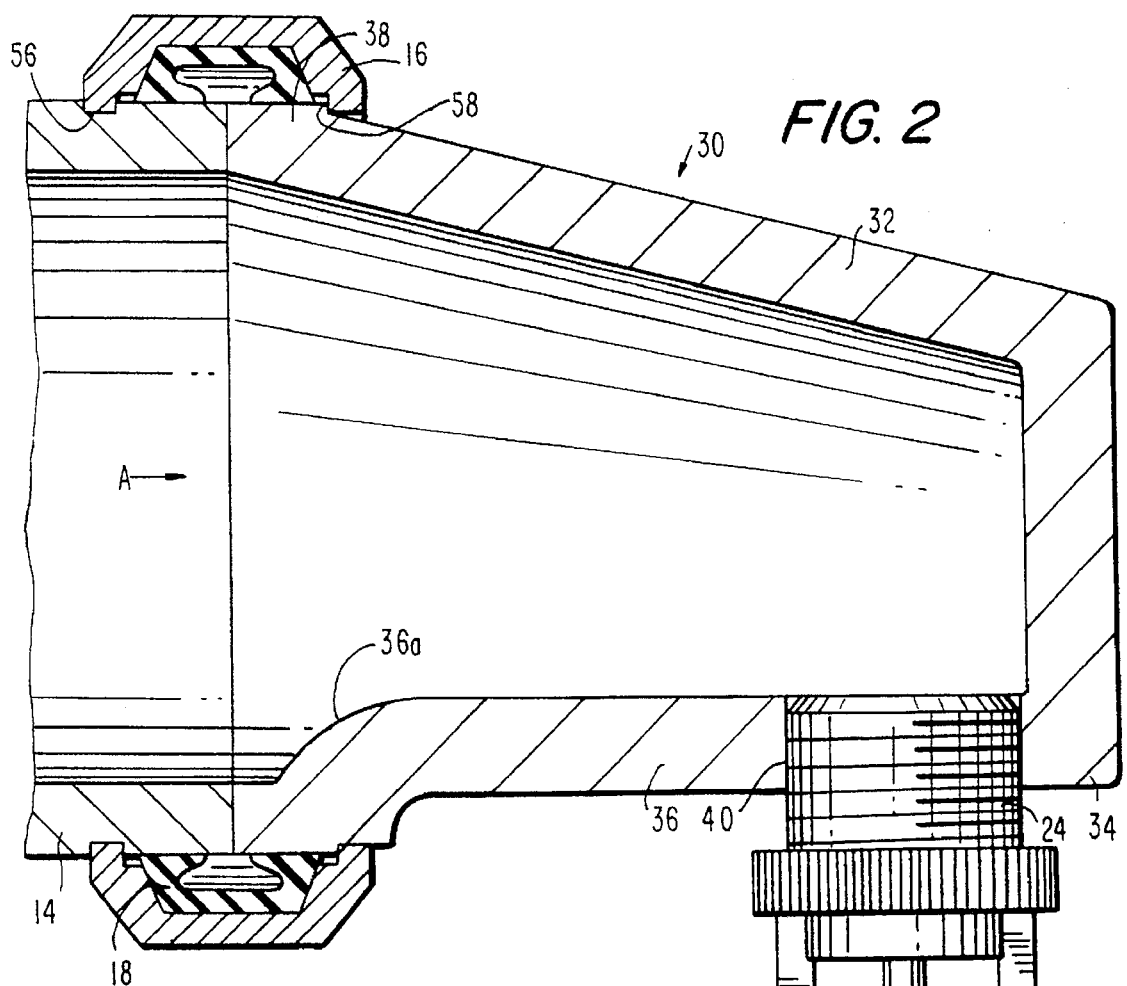
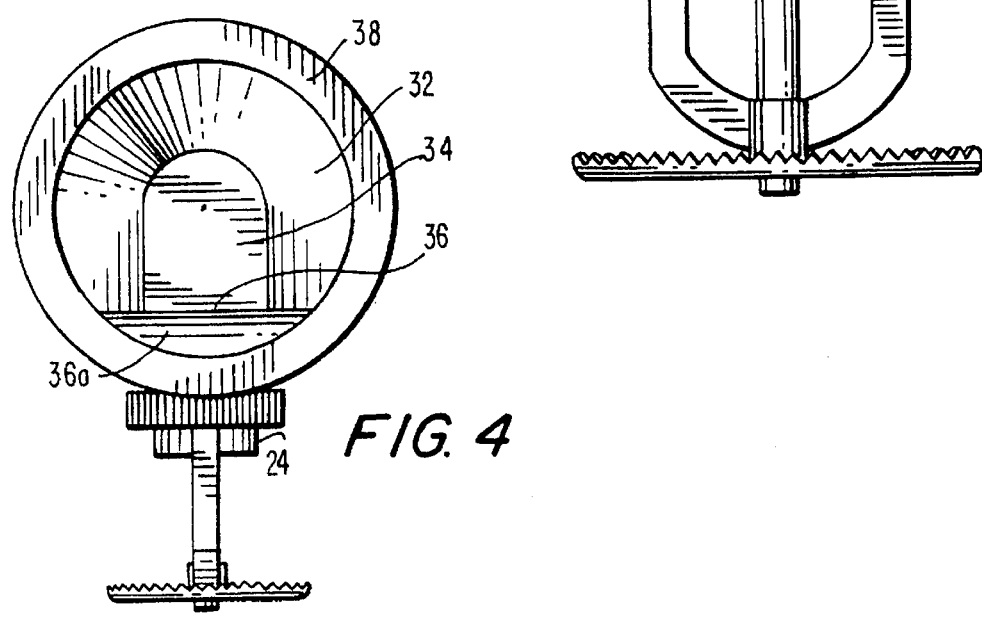

END FITTING FOR SPRINKLER SYSTEM

FIELD OF THE INVENTION

This invention relates to an end fitting for use at the terminal end of a conduit employed in the fabrication of a sprinkler system.

Typically, such a system will be comprised of pipes having an internal diameter of 1.5" to 2.5", that at spaced positions along their length are provided with sprinkler heads that extend perpendicular to the longitudinal axis of the associated pipe. The sprinkler heads can be attached to the associated pipe in any one of a number of manners, such as well known in the art. Threaded saddles can be provided on the pipe for securement of the respective sprinkler heads, the saddles communicating with the pipe interior by means of a bore extending radially of the pipe axis. Alternatively, the fitting for support of the sprinkler head can be brazed, welded or otherwise secured to the pipe, the fitting having a bore communicating with the pipe interior.

Such pipelines of sprinkler systems, of necessity require an end closure for the remote end of the pipe. This can be provided by an end fitting in the form of a cap providing an end closure for the pipe, which has been secured to the pipe in any convenient manner, such as by threading onto the pipe, or, by the use of a segmented pipe coupling in the manner later described.

However, the provision of an end cap, in turn involves a wastage of pipe. Rather than to provide a blank end cap, and in the interest of cost savings, it is highly desirable that the end cap be eliminated, and, that the end fitting itself provide a mounting for the terminal sprinkler head of that pipeline.

Throughout the following description, reference is made to the use of segmented pipe couplings for use in the assembly of the sprinkler system. It will be understood that instead of segmented pipe couplings screw threaded couplings and the like can be used.

The threading of the pipe ends and the threading of the end fittings must, however, be effected prior to assembly of the sprinkler system, this involving additional time and consequential cost, with the added additional expense of hand-assembling the end fittings onto the respective pipes, and effecting the necessary caulking operations on the threads of the pipes and fittings. While the use of segmented pipe couplings is preferred, it is to be understood that the use of threaded pipes and end fittings is included in this invention.

Segmented pipe couplings are comprised of two or more coupling segments of arcuate form having keys on their inner periphery for engagement within a circumferential groove cut in the pipe end, or otherwise formed, for example, by a rolling operation, The respective coupling segments are positioned over a seal member of an elastomeric material that has been positioned over the pipe ends, subsequent to which traction bolts securing the respective coupling segments to each other are tightened down to bring the respective coupling segments into clamping engagement with the pipes, or, in the event that an end fitting is employed, into clamping and sealing engagement with a radially extending end flange of the end fitting.

Segmented pipe couplings are available which provide a flexible connection between the pipe ends, or the end of the pipe or the end fitting, and, also are available as coupling which provide a rigid connection between the respective pipe ends or the pipe end and end fitting. A flexible coupling is one which permits the longitudinal axis of the respective pipes to angle and rotate relative to each other, with additional capability of moving axially relative to each other to a limited extent. A rigid coupling is one which inhibits such angular and rotational movements or axial movements of the respective pipes, or the pipe and end fitting of present concern. Thus, the use of rigid couplings is preferred.

BACKGROUND OF THE PRIOR ART

As previously mentioned, it is known to form a pipeline over-length, and, then to close the end of the pipe by an end cap or end fitting, the end cap either being threaded onto the pipe end and sealed, or, secured thereto by a segmented pipe coupling.

This, however, represents a wastage of materials in that the pipe must terminate axially beyond the last sprinkler head in the assembly.

This problem previously has been addressed, an end fitting being known, as is illustrated FIG. 1 of the accompanying drawings, which is comprised of radially extending annular cap, the central opening of which communicates with an outlet pipe, that of necessity, must extend arcuately in a 90° angle for the outlet thereof to extend perpendicular to the pipe axis, the pipe terminating in an internally threaded end collar within which the threaded shank of a sprinkler head is secured.

Typically, the pipes of such pipelines have a minimum internal diameter of between 1.5" and 2.5". Also, typically, the outlets of such end fittings must have a bore of at least 0.5" in order to provide adequate water flow to the sprinkler head. Further, the sprinkler must be assembled onto the pipe fitting at a distance sufficient from the pipe to permit the installation of a sprinkler guard on the sprinkler head.

This requires that the radius of curvature of the outlet pipe extending from the end flange of the end fitting must be on a radius of curvature at least equal to the radius of the pipe.

The end fitting, however, is not nearly as robust as the pipe itself. Thus, impact on the end fitting during assembly of the sprinkler system can cause bending or breakage of the outlet pipe of the end fitting. Additionally, the end fitting presents an appearance which is less than attractive.

A major disadvantage with such known end fittings is that while the end flange of such fittings must block off a surface area of 4.9 square inches, the outlet pipe itself only presents an outlet opening of 0.20 square inches. Thus, water progressing along the pipe to the sprinkler head, when the sprinkler head is active, encounters a radial end wall, which extends perpendicular to the axis of the pipe, and, which represents a major source of pressure losses, turbulence and eddy currents, this in turn resulting in a loss in the pressure of fluid exiting the central aperture. Further, as the fluid exiting the central aperture, must itself be changed in direction by 90°, further pressure losses are encountered in the outlet pipe to the sprinkler head. Additionally, pressure losses are caused by the contraction loss from the pipe diameter to the central aperture diameter.

These losses in dynamic and static pressure result in the sprinkler head at the end of the pipe being incapable of operating as efficiently as the other sprinklers in the line. Regulatory and insurance requirements require a determined minimum flow from any one of the sprinkler heads, regardless of the location of that sprinkler head in the sprinkler system. This in turn mandates an oversizing of the supply pipe with the additional cost thereon.

SUMMARY OF THE INVENTION:

The invention has for its object to significantly reduce dynamic and static pressure losses in the end fitting, thus permitting downsizing of the supply pipe.

Another object of the present invention is to provide a cast end fitting that does not require a core in the casting of the end fitting, thus substantially reducing the cost of manufacturing the end fitting.

A further object of the present invention is to provide an end fitting that will guide assembled sections of pipeline and sprinkler heads that have been pre-assembled and pre-tested, by providing a slide or skid at the leading end of the pipeline that will automatically "find" holes through which the pipeline is to be passed, and pass over obstructions in the path of movement of the pre-assembled pipeline and sprinkler heads.

Another object of the invention is to eliminate the relatively weak and unattractive radiusing of known end fittings, thus to provide an end fitting of greater structural strength, and that is less prone to damage than known end fittings.

According to the present invention, an end fitting for a pipeline of a sprinkler system preferably is configured as a hollow frustum of a cone having a radially extending end flange, and a closure at the smaller end of the frustum.

The frustum itself is not completely circular, except at the end flange, but includes a flat surface that extends substantially parallel to the pipe axis when the end fitting is installed on a pipe end, thus to provide a planar surface on which a sprinkler head can be seated, a threaded bore being provided extending through the planar surface, permitting threading of the threaded shank of the sprinkler into the fitting.

The advantages of this construction are that firstly the flow of water passing longitudinally through the pipe and through the sprinkler head does not meet with an abrupt end face of the end fitting, but instead is directed into the end fitting in a relatively quiescent manner that significantly reduces eddy currents and turbulence.

The water entering the end fitting passes interiorly frustum from the larger to the smaller diameter end thereof in the substantial absence of pressure losses due to contraction. While this has the effect of retarding the volume per unit time of water flow, it also has the beneficial effect of increasing the dynamic pressure in the water flow as it proceeds from the larger diameter end of the frustum towards the smaller diameter end thereof.

In this manner eddy currents and turbulence are suppressed, while at the same time the dynamic pressure of the water flow is increased as it passes through the frustum from the larger end thereof to the smaller end thereof, the pressure increase acting to compensate for the pressure losses that have occurred in the end fitting as a consequence of surface friction, residual eddy currents and turbulence.

The dynamic pressure of the water flow at the smaller end of the frustum thus can be held closely equivalent to the dynamic pressure existing in the pipeline.

The relatively quiescent water flow eventually encounters the end wall of the fitting, at which time its forwards progress is blocked by the end wall. This results in an increase in the pressure of the water available to sprinkler head, and which counteracts the dynamic pressure loss resulting from the 90° rotation of the water flow, in preparation for its exiting through the ejection nozzle of the sprinkler head.

The increase in dynamic pressure in the water flow, as offset by the surface friction, residual eddy currents and turbulence and change of direction of the water flow, results in the water flow exiting the standard sprinkler nozzle being very closely equivalent the water flow exiting through each other of the standard sprinkler nozzles, thus assuring equal volume and coverage of the ejected water exiting the sprinkler head at the end of the pipeline.

DESCRIPTION OF THE DRAWINGS

The invention will now be described with reference to the accompanying drawings, which illustrate a preferred embodiment of the invention, and, in which:

FIG. 2 is a longitudinal cross-section through an end fitting according to the present invention;

FIG. 4 is a view of the end fitting of the present invention taken in the direction of the arrow 4 in FIG. 2.

DESCRIPTION OF THE PRIOR ART

Figure 1:
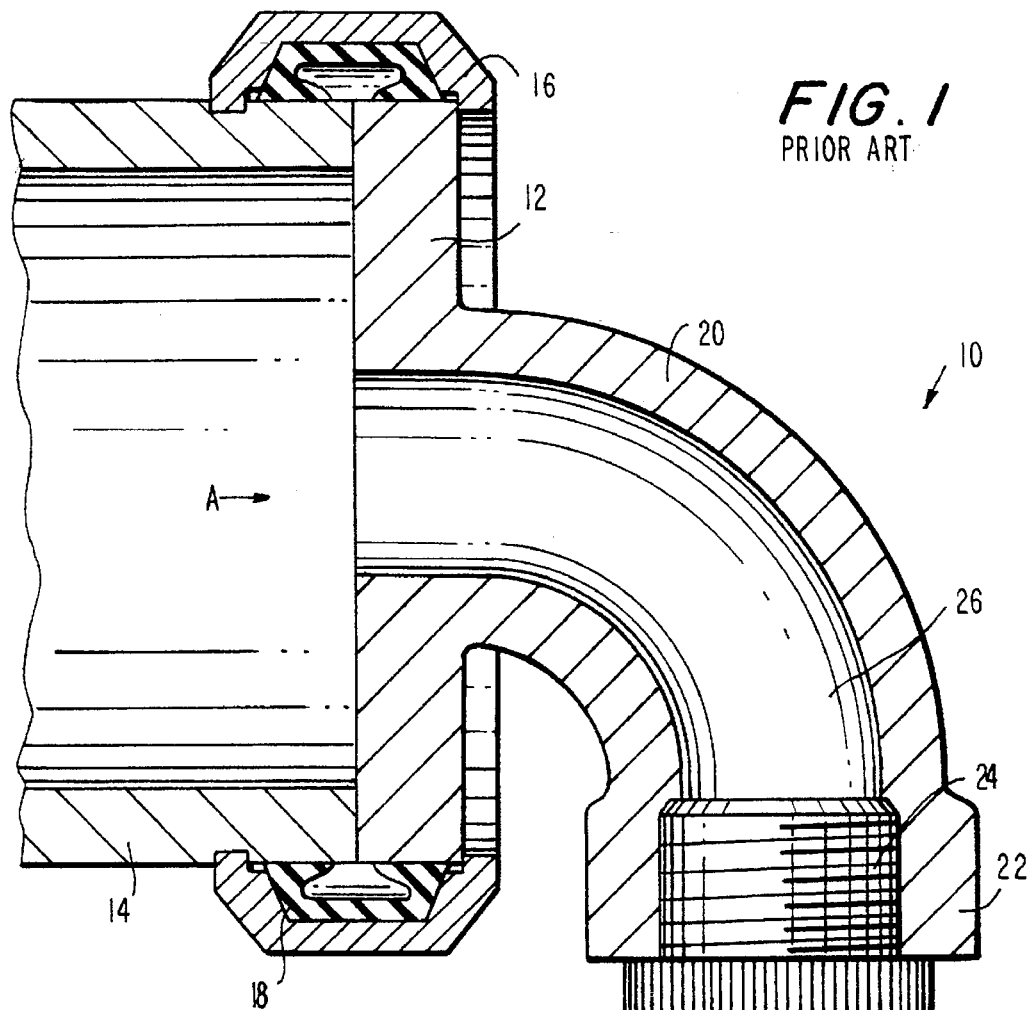
FIG. 1 is a longitudinal cross-section through a prior art end fitting.

FIG. 1 shows an fitting indicated generally at 10 which is comprised of a radially extending annular flange 12 having an outer diameter closely approximating that of the outer diameter of a supply pipe 14 to which the end fitting 10 is attached by means of a known segmented pipe coupling 16, the joint between the annular flange 12 and the supply pipe 14 being sealed by an elastomeric seal 18, in a manner well known in the art.

The annular flange 12 of the end fitting is cast integrally with a right-angle elbow 20, the elbow 20 terminating at its end in an internally threaded boss 22, in which a sprinkler head 24 is threadedly secured.

As will be apparent, the end fitting of FIG. 1, which is made by a casting operation, involves a two-part mold, in order to mold the flange and the right-angled elbow, and also requires the insertion into the mold of a core, in order to provide the internal passage 26 in the elbow, the requirement for a core in turn carrying with it the requirement for subsequently removing the core from a cast end fitting, and, the subsequent internal threading of the threaded boss 22.

Each of those operations represent a significant cost factor in the manufacture of the end fitting.

In terms of its effectiveness, the end fitting the prior art is encumbered with numerous disadvantages.

Water flow through the pipe 14, must first encounter the radial end face of the annular flange 12, which extends substantially perpendicular to the pipe axis. In the event that the pipe has an internal diameter of 2.5", and the internal passage 26 of the right-angled elbow 20 has a diameter of 0.5", such as is common in the art, then, the water flow in the direction of the arrow A is almost completely obstructed the cross-sectional area of the pipe interior representing 4.9 square inches, whereas the outlet provided by the internal passage 26 represents only 0.20 square inches, this leaving a completely blocked area of 4.70 square inches.

On the other hand, a high velocity flow of water in the direction of the arrow A and through the internal passage 26 is required at the time the sprinkler head 24 is in an opened condition. This high velocity flow of water concentrically of the pipe 14 has the effect of inducing axial flow towards the annular flange 12 of the surrounding of volume of water, which only can be dissipated by a reverse flow of the surrounding volume of water. This results in a pressure loss in the water flowing into the internal passage 26 caused by the reverse flow, eddy currents and other tubulences in the pipe 14, the loss in pressure also being accompanied by contraction losses and frictional restraint on the water entering the internal passage 26.

By configuring the end fitting to have an annular end flange 12, a first source of pressure loss is present. The water entering the internal passage 26 is then subjected to a second pressure loss resulting from the change in direction of the water flow, accompanied by frictional skin effects and further turbulence and eddy currents as the exiting water flow passes through the right-angled elbow 20.

The culmination these pressure losses is that the water pressure available to the sprinkler head 24 is lower than that available at other sprinkler heads along the line, which, if a standard sprinkler head is employed as a sprinkler head 24, will result in a lower output volume and reduced dispersion throw of the sprinkler head 24 as compared with other sprinkler heads along the line.

Regulatory and insurance requirements require a determined minimum flow from any one of the sprinkler heads along the line. Thus, for consistency of water dispersion and flow volume, the supply pipe is required to be oversized in order to provide an equivalent water flow and dispersion throw to the other standard sprinkler heads in the line.

Apart from being visually unattractive, the sprinkler head of the prior art is less than robust and is susceptible to damage by impact on the right-angled elbow 20, which in turn must be of relatively massive construction capable of withstanding such impacts, this in turn increasing the weight and the cost of the end fitting.

Further, the right-angled elbow must be of a radius equal to the radius the pipe to which the end fitting is attached in order for the sprinkler head to extend perpendicular to the pipe axis. The right-angled elbow and its threaded boss 22, is thus required to extend beyond the outer diameter of the pipe 14. This presents an inconvenience in increasing the distance that the sprinkler head must extend radially of the pipe axis and also represents an inconvenience in the event that the pipeline is to be preassembled prior to its installation, and then threaded into its supporting brackets.

As will be apparent, it is advantageous to be able to assemble a complete line of sprinkler heads onto the pipe 14 prior to the installation of the pipe and sprinklers into the sprinkler system. This permits testing of the assembly prior to its incorporation into the sprinkler system at an elevated location.

DESCRIPTION OF THE INVENTION

The end fitting of the present invention overcomes these problems by eliminating the major sources of pressure losses. Firstly, the annular flange 12 of the prior construction is eliminated in its entirety, thus eliminating a major source of pressure losses. Secondly the right-angled elbow 20 is eliminated in its entirety, thus eliminating the further pressure losses occurring in the right-angled elbow 20, and additionally eliminating the mechanical weakness of such a right angled elbow.

According to the present invention, the end fitting, indicated at 30 is in the form of a frustum of a cone, the larger end of which is attached to the pipe 14 by use of a segmented pipe coupling 16, the end fitting comprising an arched side wall 32, and a planar rectilinear side wall 36, that terminate in an end wall 34.

The side walls 32 and 36 commence in an annular end wall 38 adapted to abut the end of the pipe 14, and be secured thereto by the pipe coupling 16, thus to provide a continuation of the bore of the pipe 14.

As will be apparent, disturbances caused in the water flow by the annular flange 12 of the prior art end fitting are eliminated in their entirety, the end fitting of the present invention permitting a quiescent water flow in the direction of the arrow A without turbulence.

The water flow then passes into the interior of the end fitting 30, which is configured as a convergent nozzle. This has the effect increasing the pressure of the water flow as it passes from the open annular end wall 38 towards the end wall 34, i.e., instead of a pressure loss being incurred as in the right-angled elbow 20 of the prior art construction, a compensating pressure increase is generated, and this, in the substantial absence of any eddy currents or turbulence.

By virtue the compensating increase in the dynamic pressure of the water flow as it progresses from the open end 38 towards the closed end 34, the static pressure available at the closed end 34 is maintained closely equivalent to that in the pipeline 14 itself.

The water flow is then required to change direction in order for it to pass through the sprinkler head 24, which will occasion a pressure loss. That pressure loss is, however, the same as that encountered by each other sprinkler head along the line.

In this manner, the water pressure and the available flow rate to the sprinkler head 24 is held comparable to that of the water pressure and flow rate available to any other sprinkler head along line, thus enabling the sprinkler head 24 to be a standard sprinkler head having the same characteristics as any other sprinkler head along the line.

The sprinkler head is attached to the planar and rectilinear side wall 36 of the end fitting 30 by threading it into a threaded bore 40 provided in the end fitting 30 subsequent to the casting of the end fitting 30, this itself constituting a minor manufacturing operation.

Figure 5:
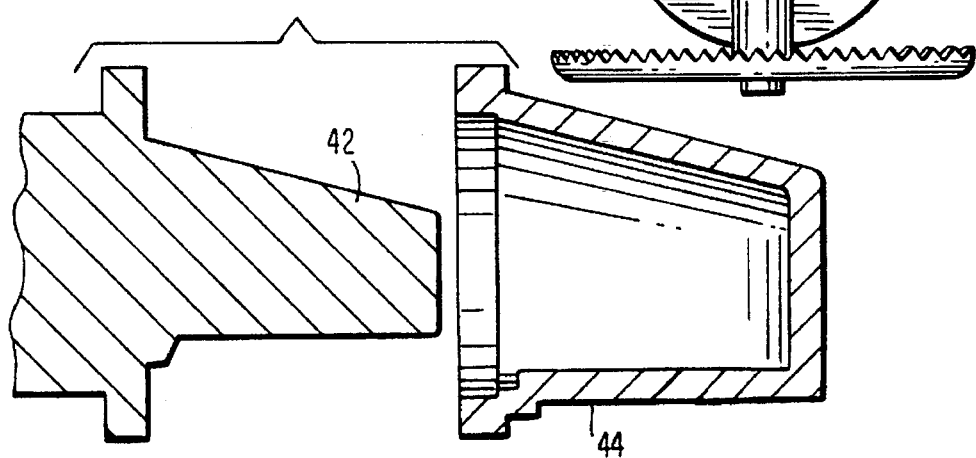
FIG. 5 is illustrative of the respective male and female members of a mold employed for casting the end fitting of the present invention.

Of major importance is that the end fitting 30 of the present invention can be cast in the total absence of a core member, such as is required in the casting of the prior art end fitting. This presents a major cost saving in the production of the end fitting 30 of the present invention, which as diagrammatically illustrated in FIG. 5 can be cast employing a male mold 42 configured to provide the internal conical surfaces of the end fitting 30, and an outer female mold 44 configured to contour external surfaces of the end fitting 30.

The respective molds 42 and 44 are devoid of any re-entrant surfaces, and, thus need not be destroyed after a casting operation. The respective molds thus can be permanent molds employed for casting a continuous series of end fittings 30, this representing a further economy in the cost of manufacture of the end fittings.

Modern casting techniques permit the casting of the end fittings 30 in the final finish form, thus eliminating the need for finish machining. Also, as the respective molds interfit, instead of being arranged in abutting relationship as required in production of the end fitting of the prior art, the exterior of the end fitting 30 according to the present invention is devoid of any flashings or spines that must be removed by a grinding operation. Further, as the requirement for a core is eliminated, the necessity for subsequently removing that core also is eliminated, the total resulting being that a fully finished end fitting according to the present invention can be produced in a single operation in a highly economical manner, the only requirement being to subsequently provide the threaded bore 40.

FIG. 4 is an end view of the fitting 30 taken in the direction of the arrow 4 in FIG. 2, and more clearly illustrates the manner in which the annular end wall 38 converges into the frusto-conical side wall 32 and the planar rectilinear side wall 36, and also the terminating end wall, each of which combined to provide the surfaces of frustum of a cone, and, each of which is devoid of any surfaces that would produce eddy currents and turbulence in the water flow, with the possible minor exception of the step 36a extending cord-wise of the frustum, and which is essential in order to provide the planar rectilinear side wall 36.

Preferably the end fitting 30 is attached to the pipe 14 employing a self-adjusting pipe clamp and coupling if the type disclosed in U.S. Pat. No. 4,639,020 issued Jan. 27, 1987, that coupling being capable of clamping the end fitting 30 into abutting relation with the end of the pipe 14 in a manner inhibiting axial, angular or rotational movements of the end fitting 30 relative to the pipe 14.

A segmented pipe coupling as disclosed in the U.S. patent includes coupling segments that are provided with oppositely angled end faces 46 and 48 at the respective ends of the coupling segments 50 and 52. When clamped together by a traction bolt 54, the ends of the coupling segments 50 and 52 are caused to move oppositely relative to each other along the axis of the pipe, in order to bring the keys of the coupling segments into clamping engagement with the side walls of the groove 56 formed in the pipe, and also into clamping engagement with a step 58 formed exteriorly of the end fitting 30 in concentric relation with the annular end wall 38 of the end fitting 30. In this manner the end fitting is immobilized against angular, rotational or axial movements relative to the pipe.

Figure 3:
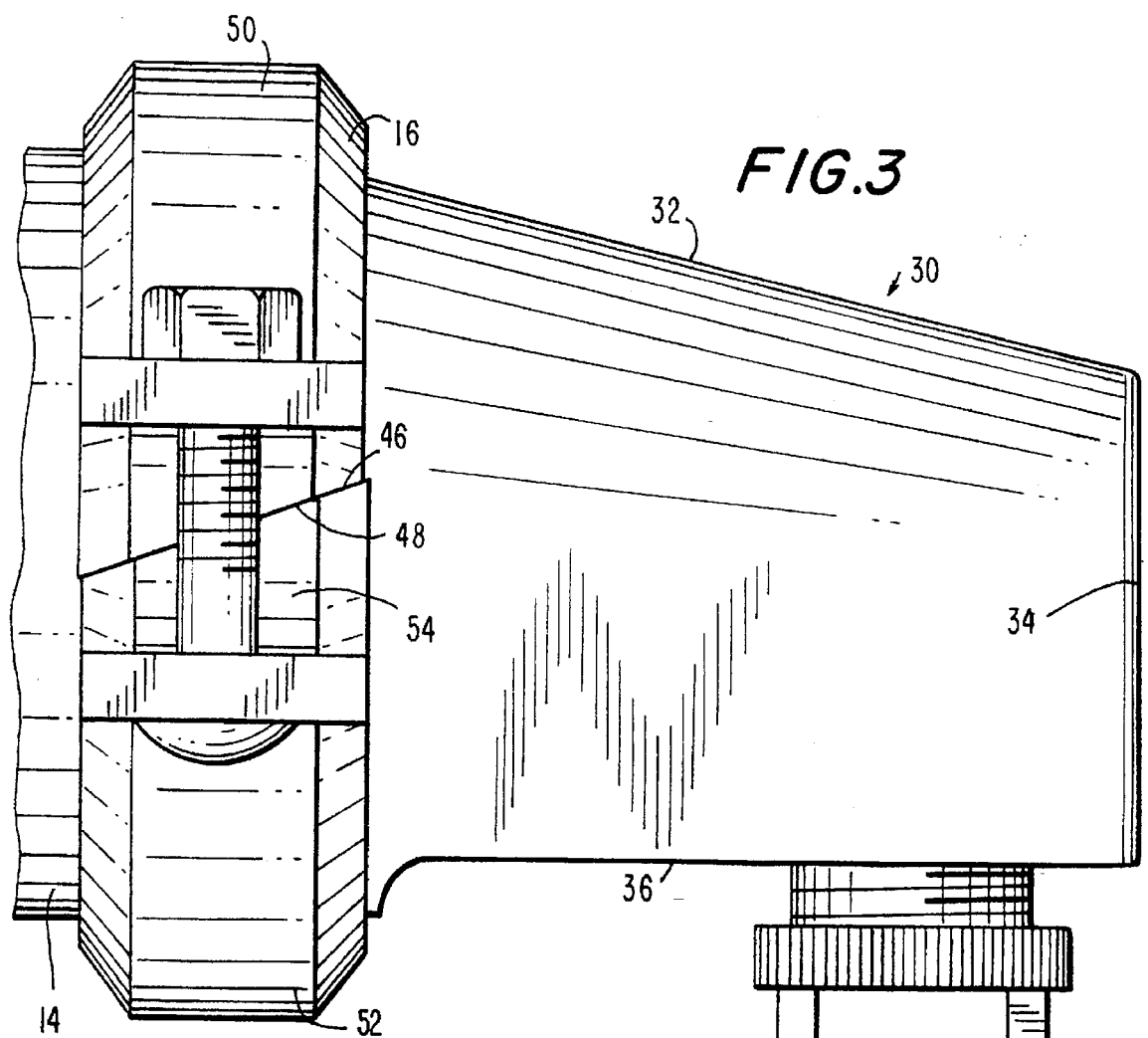
FIG. 3 is a front elevation.
Figure 6:
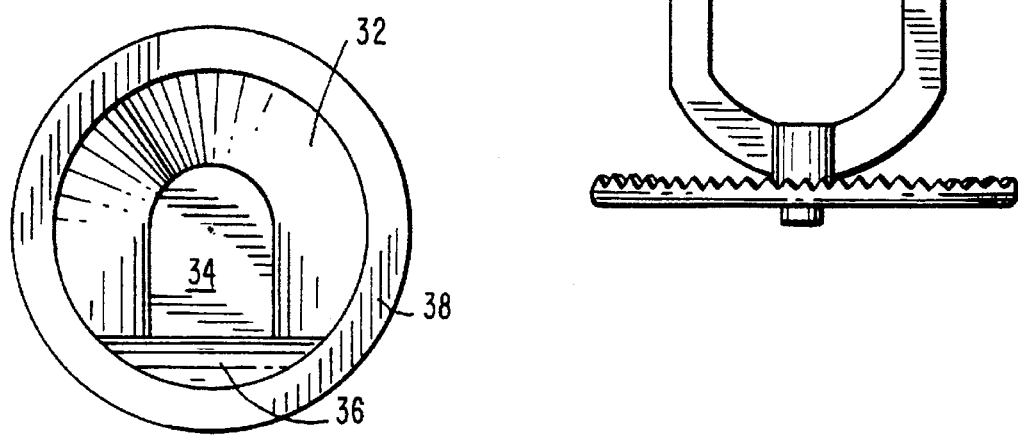
FIG. 6 is an end view of the end fitting of the present invention.

An advantage of the structure of the present invention is that the sprinkler head 24 can be positioned at a smaller distance from the pipe axis then is possible according to the prior art. Additionally, as the end fitting 30 converges away from the pipe end, the outer surface of the end fitting 30 can be employed as a skid or guide for use in the positioning of the assembled pipeline assembly subsequent to its assembly at a location remote from the installation point, the assembled pipeline having been rotated through 180° to enable such an operation, the pipeline assembly subsequent to installation then being rotated to 180° to its initial position as illustrated in FIGS. 2 and 3.

Through out the description, reference has been made to the use of segmented pipe couplings for use in securing the end fitting 30 to the end of the pipe 14. Alternative manners of securement can be employed, for example, the threading of the pipe end and the provision of a correspondingly threaded bore at the entrance end of the end fitting 30.

What is claimed is:

1. An end fitting for a water supply pipe of a sprinkler system, said end fitting including:

an elongate hollow body member having a side wall;

attachment means at one end of said hollow body member for attaching said hollow body member to an end of a said supply pipe; and, a closure for an opposite end of said elongate hollow body member;

said side wall converging from said one end of said hollow body member to said opposite end thereof to provide a bore of said hollow body member of progressively decreasing transverse cross-sectional area from said one end of said hollow body member to said opposite end thereof; and, means for the attachment of a sprinkler head to said body member at a position spaced from said one end.

2. The end fitting of claim 1, in which said side wall of said hollow tubular body member defines a longitudinal axis of said hollow body member, said attachment means being operative to secure said hollow body member to said pipe with said longitudinal axis of said hollow body member extending in parallelism with a longitudinal axis of said pipe.

3. The end fitting of claim 1, in which said side wall, when viewed in transverse cross-section defines a continuous outer wall of a hollow cylinder and includes a rectilinear wall portion extending transverse to said longitudinal axis of said hollow body member.

4. The end fitting of claim 3, in which said rectilinear wall extends longitudinally of said hollow body member in parallelism with said longitudinal axis of said pipe and includes an aperture spaced from said securement means permitting the passage of water in a direction perpendicular to said longitudinal axis of said hollow body member, and into a sprinkler head secured to said hollow body member.

5. The end fitting of claim 4, in which said sprinkler head includes a threaded shank, which is received within a threaded bore providing said aperture in said rectilinear wall of said hollow body member.

6. The end fitting of claim 4, in which said rectilinear wall defines a planar surface extending longitudinally and transversely of said longitudinal axis of said hollow body member.

7. The end fitting of claim 1, in which an interior wall of said hollow body member defines a sector of a frustum of a cone, further including an end wall at said opposite end of said hollow body member providing said closure of said hollow body member.

8. The end fitting of claim 1, in which said attachment means comprise a radially and outwardly extending flange of said hollow body member at said one end of said hollow body member.

9. The end fitting of claim 1, in which said hollow body member defines a continuous inner wall devoid of re-entrant portions, and which extends in converging relation to said longitudinal axis of said hollow body member from said one end of said hollow body member to said opposite end thereof;

whereby, said hollow body member can be cast employing a male and female die alone in the absence of a core member.

\* \* \* \* \*